United States Patent
Flanigan et al.

(10) Patent No.: US 11,106,805 B2
(45) Date of Patent: Aug. 31, 2021

(54) GENERATING UNIFIED DATA ON AN ELECTRONIC DEVICE

(71) Applicant: BlackBerry Limited, Waterloo (CA)

(72) Inventors: Mark Justin Flanigan, Ottawa (CA); Linda Marie Damus, Ottawa (CA); Chad Robert Ford Furniss, Kitchener (CA); Geordon Thomas Ferguson, Mississauga (CA); Francis Patrick Judge, Andover, MA (US)

(73) Assignee: BlackBerry Limited, Waterloo (CA)

( * ) Notice: Subject to any disclaimer, the term of this patent is extended or adjusted under 35 U.S.C. 154(b) by 28 days.

(21) Appl. No.: 15/288,897

(22) Filed: Oct. 7, 2016

(65) Prior Publication Data

US 2018/0101422 A1  Apr. 12, 2018

(51) Int. Cl.
*G06F 21/60* (2013.01)
*G06F 21/62* (2013.01)
*G06F 9/54* (2006.01)

(52) U.S. Cl.
CPC ............ *G06F 21/606* (2013.01); *G06F 9/541* (2013.01); *G06F 21/6209* (2013.01)

(58) Field of Classification Search
CPC ........ G06F 9/546; G06F 21/606; G06F 9/541; G06F 21/6209
See application file for complete search history.

(56) References Cited

U.S. PATENT DOCUMENTS

| 8,799,227 B2* | 8/2014 | Ferguson | G06F 21/6218 707/654 |
| 9,479,541 B2 | 10/2016 | Singh et al. | |
| 9,720,915 B2* | 8/2017 | Ferguson | G06F 21/6218 |
| 2008/0209007 A1* | 8/2008 | Gurecki | G06F 17/30545 709/218 |
| 2013/0124583 A1* | 5/2013 | Ferguson | G06Q 10/00 707/821 |
| 2014/0207821 A1* | 7/2014 | Ferguson | G06F 16/1774 707/781 |
| 2016/0149958 A1* | 5/2016 | Singh | H04L 63/205 726/1 |

* cited by examiner

*Primary Examiner* — Doon Y Chow
*Assistant Examiner* — Kimberly L Jordan
(74) *Attorney, Agent, or Firm* — Fish & Richardson P.C.

(57) ABSTRACT

Systems, methods, and software can be used to generate unified data on an electronic device. In some aspects, a request for unified data is received at a unified content provider and from an application. Both the unified content provider and the application are associated with a first container on an electronic device. The requested unified data is determined to include data associated with a second container on the electronic device. A request for the data associated with the second container is sent. The data associated with the second container is received. The unified data is generated based on the data associated with the second container and data associated with the first container. The generated unified data is sent to the application.

20 Claims, 3 Drawing Sheets

GENERATING UNIFIED DATA ON AN ELECTRONIC DEVICE

TECHNICAL FIELD

The present disclosure relates to generating unified data on an electronic device.

BACKGROUND

In some cases, electronic devices, including mobile devices or other computer systems, enable users to run applications on the electronic devices. The applications may access application data stored on the electronic devices.

DESCRIPTION OF DRAWINGS

Like reference numbers and designations in the various drawings indicate like elements.

DETAILED DESCRIPTION

Many electronic devices, e.g., mobile devices or other computing systems, use containers to manage access to resources stored on the electronic devices. For example, an electronic device can have one or more personal containers for a user's personal data and applications, and one or more enterprise containers for a user's enterprise data and applications.

Using containers to manage resources on an electronic device can help enterprises reduce the risk that enterprise resources may be accessed by, for example, malicious or vulnerable applications. For example, enterprises can give users the freedom to install their personal application in a personal container, while controlling access to resources associated with an enterprise container. In some cases, a container can be referred to as a "profile," a "perimeter," or a "workspace."

In general, containers can be implemented as groups of resources having a common management scheme, where each container generally includes one or more resources and one or more policies regarding use of or access to the one or more resources. Containers can be implemented on data communication systems that include a device and can be used to logically separate resources, e.g., files, applications, network connections, data, on the device. For example, the device can implement two or more containers, which can include a personal container, an enterprise container, or a combination of these and other types of containers. In some implementations, the device may include multiple personal containers, multiple enterprise containers, or both. A personal container can be managed by a device user, and an enterprise container can be managed by an enterprise or corporate administrator, e.g., using an enterprise mobility management (EMM) server. In some implementations, the enterprise or corporate administrator can additionally manage the personal container, the device, or both.

In some implementations, each container on a device (e.g., enterprise or personal) has its own file system on the device, and separation between containers can be provided, at least partially, by the separation of the file systems on the device. In some cases, some of the resources of each container (e.g., data and policies) are stored in a dedicated file system for the container, while other resources of each container (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories) for each file system. In some implementations, each file system has its own encryption parameters. For example, the file system for a corporate container can have its own encryption key and a higher encryption strength, while a file system for a personal container can have its own encryption key and lower encryption strength. In some instances, the file system for the personal container has the same encryption strength as the corporate container, or the file system for the personal container can be unencrypted.

As described above, a container can include a group of resources that share a common management scheme governing the use of resources in the group and can encompass both the resources and the management policies that describe how the resources may be used. The management policies can include security policies, which can be defined for the container. Applications executable by the device can include resources that, when executed, request access to other resources or provide resources to other applications (or both). For an application that is assigned to, stored in, or associated with a container, resources included in the application can be included in the group of resources in the container. Furthermore, security policies defined for the container can restrict the application to resources included in the group. Thus, when the application is executed within the container, security policies included in the management policies of the container can determine whether or not the resources associated with the application can access other resources, such as resources included in the group or resources outside the group (or both), or grant access to other applications, such as applications assigned to or associated with, or not assigned to or associated with the container (or both).

In some implementations, hybrid agents can be used to provide secure data sharing across containers. For example, a personal hybrid agent can be installed in the personal container and an enterprise hybrid agent can be installed in the enterprise container. Each hybrid agent can access resources within its respective container. Each hybrid agent can also expose Application Program Interfaces (APIs) to applications installed within their respective containers. If an application in the personal container requests data in the enterprise container, the application can contact the personal hybrid agent, which in turn can contact the enterprise hybrid agent. The enterprise hybrid agent can retrieve data in the enterprise container and send the data to the personal hybrid agent, which in turn can provide the data to the application that requested the data.

In some implementations, data stored on an electronic device can be accessed using content providers (CPs). A CP provides an interface for applications to access data and abstracts the underlying storage format of the data. The interface can be implemented using a client object. The CP can encapsulate the data and provide mechanisms for defining data security. In some cases, a CP can be data type-specific. In these cases, a CP can manage access to a specific type of data. For example, a contact CP can include software codes that manage contact data, while a calendar CP can include software codes that manage calendar data. In some cases, a CP can be generic, and manage more than one type of data. Therefore, an application can invoke a CP to add, move, update, delete, or query the data. In some cases, data content can be identified by a uniform resource identifier (URI) string, e.g., "content://contact."

In some cases, a CP in one container can access data in the same container, but the CP may not have access to data in a different container. Therefore, if an application in one container, e.g., a personal contact viewer application, attempts to collect contact data of more than one containers, e.g., both the personal container and the enterprise container, on the electronic device to present a unified view of the contact information, the application may not be able to use a single client object call to retrieve data across containers. The application may use a CP in the personal container to retrieve personal contact data, request enterprise contact data by invoking the hybrid agents, and unify the received personal contact data and the enterprise contact data. These operations add complexities of the applications that request unified data across containers and reduce the benefit of the CP platform that abstracts the data storage implementations of the electronic device.

Figure 1:
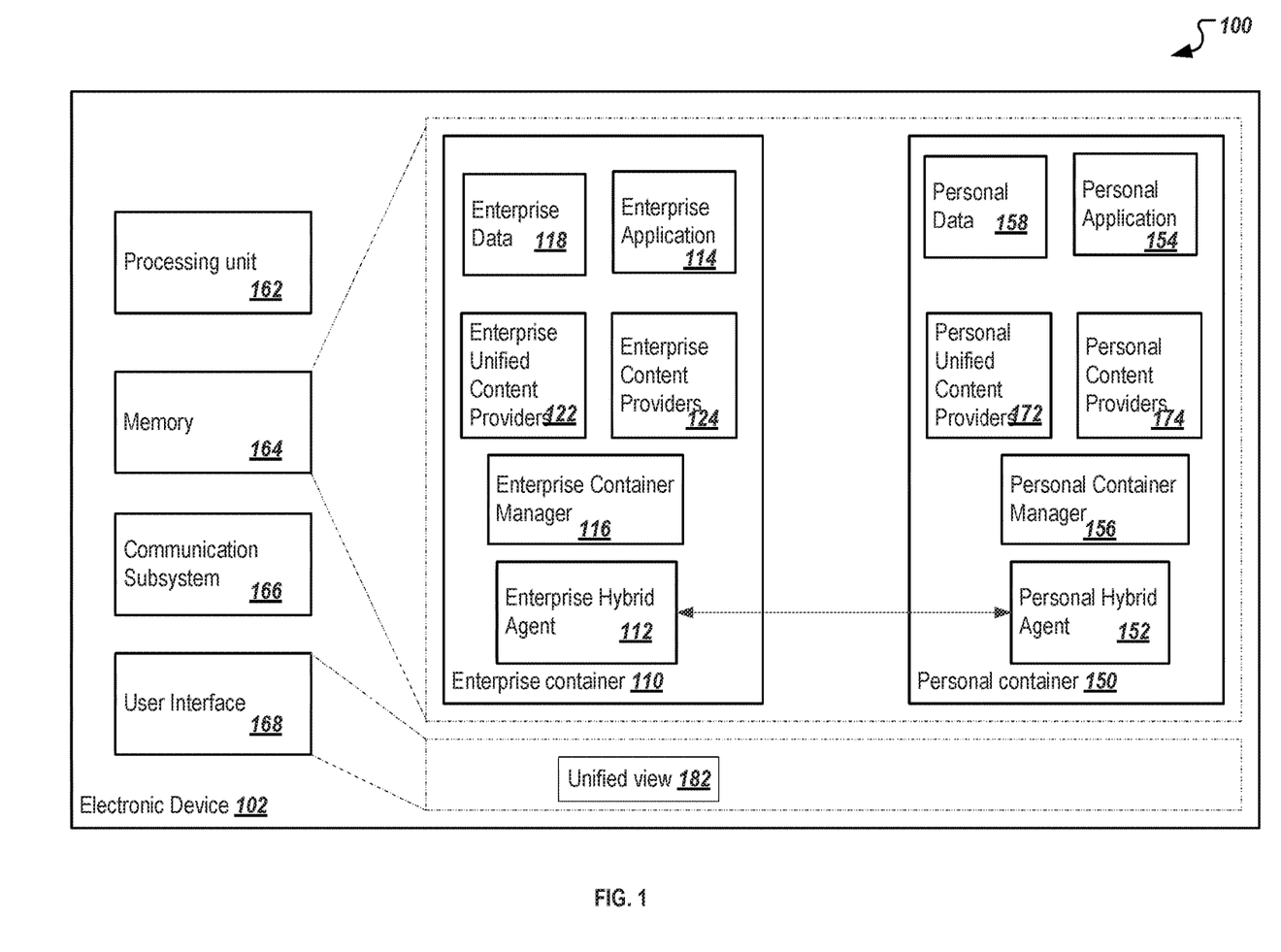
FIG. 1 is a schematic diagram showing an electronic device 102 that generates unified data according to an implementation.
Figure 2:
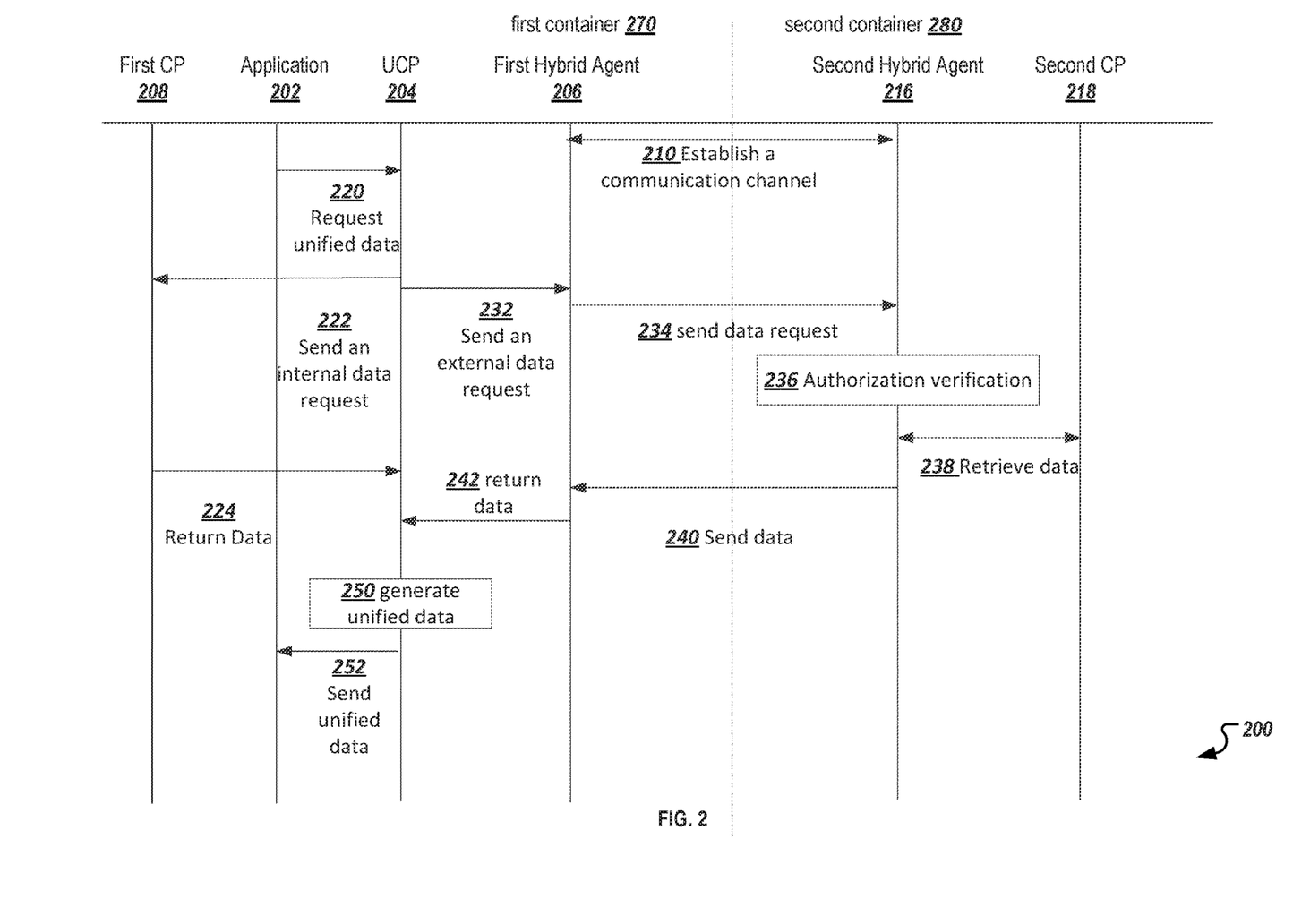
FIG. 2 is a flow diagram showing an example process for generating unified data according to an implementation.
Figure 3:
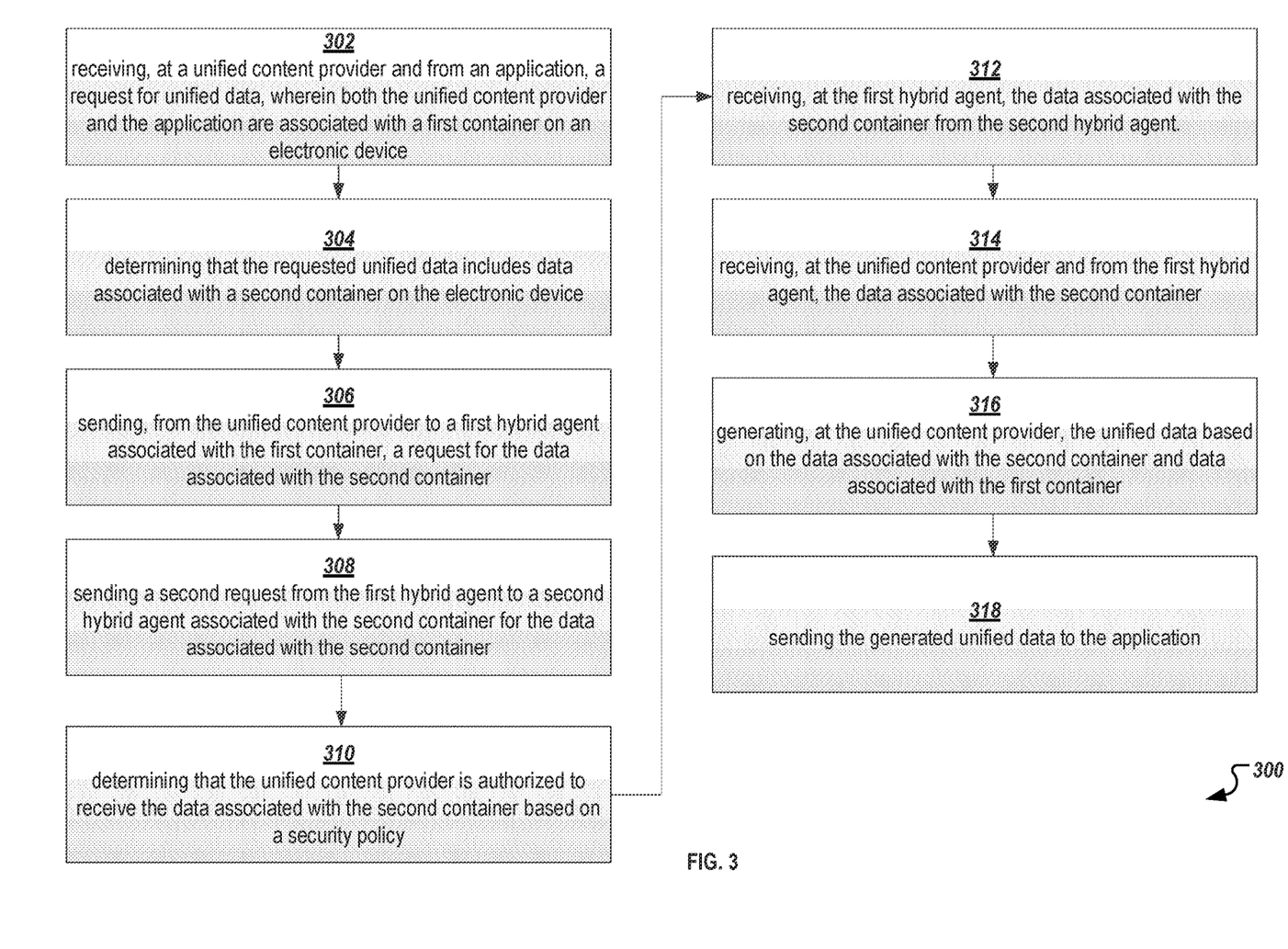
FIG. 3 is a flow diagram showing an example method for generating unified data according to an implementation.

In some cases, a unified content provider (UCP) can be implemented to provide an interface to access unified data across containers and reduce complexities of the applications requesting unified data. When an application requests unified data, the application can invoke the UCP in the container, the UCP can retrieve data in the same container, request cross-container data using hybrid agents, generate unified data, and return the unified data to the requesting application. The UCP can be data type-specific and manage a specific type of data. Alternatively or in combination, the UCP can be generic and manage more than one type of data. FIGS. 1-3 and associated descriptions provide additional details of these implementations.

FIG. 1 is a schematic diagram 100 showing an electronic device 102 that generates unified data according to an implementation. The electronic device 102 includes a processing unit 162, a communication subsystem 166, a user interface 168, and memory 164. An electronic device may include additional, different, or fewer features, as appropriate. The diagram in FIG. 1 also shows an enterprise container 110 and a personal container 150 stored in the memory 164. Additional or different containers may be stored in the memory 164 or other components in a communication device, as appropriate, in various implementations.

The example processing unit 162 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 162 can be configured to generate control information, such as a measurement report, or respond to received information, such as control information from a network node. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. As shown in FIG. 1, the example user interface 168 presents a unified view 182. The unified view 182 can be a graphic representation of unified data associated with multiple containers. FIGS. 2-3 and associated descriptions provide additional details of these implementations. The user interface 168 can also include I/O interface, for example, a universal serial bus (USB) interface.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above.

Containers, e.g., the example enterprise container 110 and the example personal container 150, can logically separate resources, including e.g., applications, data, network access resources, configuration files, such that resources in a given container can, in some instances, be prevented from accessing resources included in a different container. For example, personal resources in the personal container 150 may be prevented from accessing corporate resources in the enterprise container 110, or vice-versa. In some cases, as will be described in more detail below, a resource in a container can access resources in another container by using hybrid agents.

In some instances, individual containers can be added, deleted, or modified. An owner of the electronic device 102 may have the ability to add or remove individual containers from the electronic device 102. In some implementations, a user can create one or more containers. In some instances, an enterprise can send the device information identifying the initial resources (e.g., applications, policies, configurations, etc.) for a new container. A containers administrator may assign security policies for the containers and initiate container updates. In some implementations, container administrators can remotely lock or wipe a container.

As shown in FIG. 1, the example enterprise container 110 includes an enterprise hybrid agent 112, an enterprise application 114, enterprise data 118, enterprise CPs 124, and enterprise UCPs 122. The example personal container 150 includes a personal hybrid agent 152, a personal application 154, personal data 158, personal CPs 174, and personal UCPs 172.

Data, e.g., the enterprise data 118 and the personal data 158, can include various types of data, e.g., files, classes, frameworks, backup data, business objects, jobs, web pages, web page templates, database tables, repositories storing business or dynamic information, and other information including parameters, variables, algorithms, instructions, rules, constraints, or references thereto. The data may include information that is associated with an application, a network, a user, and other information.

Applications, e.g., the enterprise application 114 and the personal application 154, can include programs, modules, scripts, processes, or other objects that can execute, change, delete, generate, or process application data. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, ANDROID, iOS, or Microsoft's .NET. Further, while illustrated as internal to the electronic device 102, one or more processes associated with an application may be stored, referenced, or executed remotely. For example, a portion of an application may be an interface to a web service that is remotely executed. Moreover, an application may be a child or sub-module of another software module (not illustrated).

Hybrid agents, e.g., the example enterprise hybrid agent 112 and the personal hybrid agent 152, include software that provides secure data sharing across containers. The hybrid agents can include computer-readable instructions that, when executed by the processing unit 162, cause the processing unit 162 to discover other hybrid agents, establish communication channels with other hybrid agents, submit requests for application data to other hybrid agents, and receive application data from other hybrid agents. In some cases, an electronic device can pre-install a hybrid agent in each container. In some implementations, an enterprise mobility manager (EMM), a device policy client (DPC), an associated PIM application, or other applications can install a hybrid agent in a container. In some cases, hybrid agents can include software that enforces one or more security policies in sharing data across containers. FIGS. 2-3 and associated descriptions provide additional details of these implementations.

Container managers, e.g., the example enterprise container manager 116 and the personal container manager 156, represent an application, set of applications, software, software modules, hardware, or any combinations thereof that can be configured to manage operations of the respective container. CPs, e.g., the personal CPs 174 and the enterprise CPs 124, represent an application, set of applications, software, software modules, hardware, or any combinations thereof, that can be configured to manage access to a structured set of data. As discussed previously, a CP can be data type-specific, and manage access of a specific type of data, e.g., contact data. Alternatively or in combination, a CP can also be generic and manage access of more than one types of data.

UCPs, e.g., the personal UCPs 172 and the enterprise UCPs 122, represent an application, set of applications, software, software modules, hardware, or any combinations thereof, that can be configured to generate unified data. In some implementations, a UCP can include computer-readable instructions that, when executed by the processing unit 162, cause the processing unit 162 to receive a request for unified data, request cross-container data from hybrid agents, and generate unified data by performing merging, sorting, or a combination thereof. FIGS. 2-3 and associated descriptions provide additional details of these implementations. In some cases, a UCP can be data type-specific, and generate unified data for a specific type of data. Alternatively or in combination, a UCP can generate unified data for more than one types of data. In some cases, a UCP can include functionalities of a CP, e.g., a UCP can provide data management functions such as encapsulating the data and providing mechanisms for defining data security. In these cases, the UCP can retrieve data and manipulate data without invoking a CP. Alternatively or in combination, the UCP can invoke a CP to access data, and generate unified data based on the data provided by the CP. FIGS. 2-3 and associated descriptions provide additional details of these implementations.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components as appropriate.

FIG. 2 is a flow diagram showing an example process 200 for generating unified data according to an implementation. The process 200 can be implemented by an electronic device, e.g., the electronic device 102 shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

FIG. 2 includes a first container 270 and a second container 280. Both the first container 270 and the second container 280 are located on the same electronic device, e.g., the electronic device 102. In some cases, the first container 270 can be a personal container and the second container 280 can be an enterprise container. Alternatively, the first container 270 can be an enterprise container and the second container 280 can be personal container. The first container 270 includes an application 202, a UCP 204, a first hybrid agent 206, and a first CP 208. The second container includes a second hybrid agent 216 and a second CP 218.

The example process 200 begins at 210, where the first hybrid agent 206 and the second hybrid agent 216 establish a communication channel. In some implementations, the communication channel can be established by including a communication handle in a command. For example, the first hybrid agent 206 can send a command to the second hybrid agent 216. The command can include a first communication handle addressed to the first hybrid agent 206. The second hybrid agent 216 can use the first communication handle to send a second communication handle addressed to the second hybrid agent 216. The communication handles can be used in subsequent communications between the hybrid agents.

At 220, the application 202 sends a data request to the UCP 204. The data request can be a unified data request that requests data across containers. In this example, the application 202 is a contact application, and the data request includes a query for contact data across containers. In other examples, the application 202 can be a calendar application or any other application that can request unified data. In some implementations, the data request can include a uniform resource identifier (URI) string, e.g., "content://unified_provider/contact," to specify that the type of requested data is contact data and the request is for unified data. Alternatively or in combination, other unique identifiers can be included in the data request to indicate the type of the data requested, that the request is for unified data, or a combination thereof.

The UCP 204 receives the data request and determines that the data request is for unified data based on the data request. In response, the UCP 204 can query its own container and other containers for the requested data. For example, at 222, the UCP 204 can send an internal data request to request contact data in the same container, the first container 270, as the UCP 204.

In some cases, as illustrated, the internal data request can be sent to the first CP 208 to request contact data the first container 270. The first CP 208 is located in the first container 270 and can access the contact data within the first container 270. In some cases, the internal data request can be formatted according to an API provided by the operating system of the electronic device to request the data. In some implementations, the internal data request can include a uniform resource identifier (URI) string, e.g., "content://contact," to specify that the type of requested data is contact data.

At 224, in response to the internal request, the first CP 208 returns the requested contact data to the UCP 204. In some cases, the data can be returned in the form of a cursor object. A cursor object can be used to provide data in a tabular form, which abstracts the underlying storage format of the data. In some cases, a large quantity of data records can be requested. In these or other cases, the cursor object can be used to provide a subset of the data records in the form of a rolling window. A receiving application can use the cursor object to iterate through each data record for the remaining data records. Using a cursor object can provide an efficient method of delivering data while saving memory space.

In some cases, the UCP 204 can include data management functionalities that a CP can provide. In these or other cases, the UCP 204 can access and retrieve contact data in the first container 270 without steps 222 and 224.

As discussed previously, because the UCP 204 determines that the data request is for unified data, the UCP 204 queries different containers, e.g., the second container 280, for contact data. At 232, the UCP 204 sends an external data request to the first hybrid agent 206 to request contact data in the second container 280. In some implementations, the external data request can be formatted according to the same API as the internal data request. For example, the external data request can include a URI string, e.g., "content://hybrid-to-enterprise/contact," to request contact data in the enterprise container. Using the same API formats enables applications to seamlessly access data in the same or different containers.

At 234, in response to the first request, the first hybrid agent 206 sends a cross-container request to the second hybrid agent 216. The cross-container request can indicate the type of the data that is requested, e.g., contact data. The cross-container request can also indicate the source of the external data request, e.g., the UCP 204.

At 236, in response to the second request, the second hybrid agent 216 determines whether the UCP 204 is authorized to receive the requested data. In some implementations, the determination is made based on one or more security policies.

In some implementations, access to container resources (e.g., application and application data) may be controlled by defining, assigning, or otherwise associating a security policy to each container. A security policy may include parameters, variables, policies, algorithms, instructions, settings, or rules for enabling or preventing access to resources in one or more containers. A security policy for a container can be implemented in various formats and can include various types of information. A security policy can specify access to both the resources in another container that can be accessed by applications running in the container and resources in the container that can be accessed by applications running in another container. For example, a given container's security policy may identify other containers that are accessible, resources that are not accessible to other containers, or both. A container's security policy may identify specific users that can or cannot access specified resources in the container. In some implementations, the security policies from both containers determine whether cross-container access is granted.

In some implementations, a security policy can define or otherwise identify a process for user authentication. For example, a security policy can identify the type and content of user authentication (e.g., password strength, lifecycle) to apply to a cross-container request.

In some implementations, the security policy for how data are passed across containers can be configured by an administrator. The security policy can be configured at application level, e.g., determining which application can send or receive data across containers. The security policy can be configured at data level, e.g., determining how much data and what type of data from a specific application can be transmitted. In some implementations, when a user provides a request to access multiple containers, the request can be evaluated by the security policies of both containers. If both policies grant access, then the cross-container request may be granted.

In some implementations, a security policy can be symmetric or asymmetric. For example, under one security policy, a personal application in the personal container can use the personal hybrid agent to access enterprise data, and an enterprise application in the enterprise container can use the enterprise hybrid agent to access personal data. This approach enables unified view applications to run in either the personal or the enterprise container. Additionally or alternatively, the security policy can be asymmetric. For example, an administrator can determine that data can flow into the enterprise container but cannot flow out of the enterprise container. In such a case, the personal hybrid agent can send data to the enterprise hybrid agent, and a unified application can be installed into the enterprise container.

In some cases, a partial set of data can be provided across containers based on the configuration of one or more security policies. For example, an email provider in the enterprise container can send email subject lines rather than full emails to the personal container.

In some implementations, the hybrid agents can enforce a security policy by examining applications that are attempting to call their exposed APIs based on, e.g., signatures or permissions. The hybrid agents can determine whether the calling application is allowed to consume the hybrid agent's APIs and read data from the other container.

At 238, the second hybrid agent 236 determines that the UCP 204 is authorized to receive the cross-container contact data and retrieve the contact data in the second container 280 from the second CP 218. In some implementations, the second CP 218 can determine the retrieved data based on a security policy. For example, a security policy can include a security rule that only a subset of application data can be sent across containers. In such an example, the second CP 218 can send a subset of requested data to the second hybrid agent 216.

At 240, the second hybrid agent 216 sends the requested contact data to the first hybrid agent 206. At 242, the first hybrid agent 206 returns the cross-container data to the UCP 204. In some cases, the cross-container data is also returned in the format of a cursor object.

At 250, the UCP 204 generates unified data based on the cross-container data received at 242 and the internal data received at 224. In some cases, the UCP 204 can generate the unified data by performing a merging operation, a sorting operation, an aggregation operation, or a combination thereof.

A merging operation merges the data from different sources. In one example, the UCP 204 can receive the actual data from multiple resources, e.g., the internal data and the cross-container data. The UCP 204 can perform the merging operation by appending data from one source, e.g., the cross-container data, to data from the other source, e.g., the internal data.

In some cases, as discussed previously, the data returned to the UCP 204 can be in the format of the cursor objects. The UCP 204 can use the cursor objects to obtain the data from different sources and append the data from different sources. Alternatively, the UCP 204 can use a cursor wrapping method. For example, the UCP 204 can wrap a merger cursor over the cursor objects received from different sources. The receiving application, e.g., the application 202, can unwrap the merger cursor, use the underlying cursor objects to read data from different sources, and use the merger cursor to merge the read-out data.

A sorting operation sorts the merged data. In some cases, the data from each source may be sorted according to a specific order, e.g., alphanumerical. But when the data are merged, the order may not be disrupted. In these or other cases, the UCP 204 can perform a sorting operation to sort the merged data. In some cases, the UCP 204 can sort the actual data that are merged from different sources. Alternatively, the UCP 204 can use a cursor wrapping method. For example, the UCP 204 can wrap a sorting cursor over the cursor objects received from different sources. The receiving application, e.g., the application 202, can unwrap the sorting cursor, use the underlying cursor objects to read data from different sources, and use the sorting cursor to sort the read-out data. In one example, the sorting cursor can compare the first data record read by multiple cursor objects, output the smallest data record, read the next data record from the source having the smallest data record, output the next smallest record, and repeat the process until data records from the multiple sources are read.

The UCP 204 can also perform an aggregation operation. In some cases, some or all of the data from multiple sources, e.g., the internal data and the cross-container data, can be related to each other. For example, a same person can appear in both the enterprise contact data and the personal contact data. When the data from multiple sources are merged, duplicate entries can appear in the unified data. In some cases, the UCP 204 can aggregate the data by detecting the duplication and removing the duplication. In some cases, different information can be included in the related data. For example, the enterprise contact data can include a work phone number, a work address, or a work email address for a person. While the same person also appears in the personal contact data, the personal contact data can include different information, e.g., a personal phone number, a personal address, or a personal email address. The UCP 204 can detect the duplication of the data entries for the same person appearing in different sources, generate a unified data entry that include fields from different sources, e.g., both work phone number and personal phone number, and populate the unified data entry using information from different sources.

In some cases, the UCP 204 can store metadata associated with the aggregation operation. The metadata can include one or more aggregation rules. In some cases, an aggregation rule can indicate the particular data entry to be compared for duplication detection. For example, the aggregation rule can indicate that the name of the contact data from multiple sources can be compared to determine whether there are duplicate entries. An aggregation rule can also indicate information to be included or discarded in unified entry. For example, the aggregation rule can indicate that if there are more than one phone numbers exist in the contact data of the same person, both phone numbers can be included. However, if there are more one email addresses exist, only one email address is included. In some cases, the aggregation rule can indicate that the information to be included can be selected based on the particular container of the requesting application. For example, if the requesting application for the unified data resides in the personal container, the email address of the personal contact data is included and the email address of the enterprise contact data is discarded.

The metadata can also include information associated with how data entries from different sources are related to each other. For example, after the UCP 204 performs the aggregation operation, the UCP 204 can store the information related to duplicate entries. The information can include names of the people that appear in both in the enterprise contact data and the personal contact data. If the UCP 204 is requested to provide the unified contact data in the next time, the UCP 204 can retrieve the stored information about the duplicate entries and use the stored information to expedite the detection of duplicated data and the aggregation of the unified data.

At 252, the UCP 204 sends the generated unified data to the application 202. In some cases, the application 202 can generate a unified view based on the unified data. For example, the application 202 can generate a graphic interface for a contact presentation. The graphic interface can include a unified view of contact data from both the first container 270 and the second container 280.

FIG. 3 is a flow diagram showing an example method 300 for generating unified data according to an implementation. The method 300 can be implemented by an electronic device, e.g., the electronic device 102 shown in FIG. 1. The method 300 shown in FIG. 3 can also be implemented using additional, fewer, or different entities. Furthermore, the method 300 shown in FIG. 3 can also be implemented using additional, fewer, or different operations, which can be performed in the order shown or in a different order. In some instances, an operation or a group of the operations can be iterated or repeated, for example, for a specified number of iterations or until a terminating condition is reached.

At 302, a unified content provider receives a request for unified data from an application. Both the unified content provider and the application are associated with a first container on an electronic device. At 304, the requested unified data is determined to include data associated with a second container on the electronic device. In some cases, the first container comprises a personal container and the second container comprises an enterprise container. Alternatively, the first container comprises an enterprise container and the second container comprises a personal container.

At 306, the unified content provider sends a request for the data associated with the second container to a first hybrid agent associated with the first container. At 308, the first hybrid agent sends a second request to a second hybrid agent associated with the second container for the data associated with the second container. At 310, the second hybrid agent determines that the unified content provider is authorized to receive the data associated with the second container based on a security policy. At 312, the first hybrid agent receives the data associated with the second container from the second hybrid agent. At 314, the unified content provider receives the data associated with the second container from the first hybrid agent.

At 316, the unified content provider generates the unified data based on the data associated with the second container and data associated with the first container. In some cases, the unified content provider performs a merging operation on the data associated with the first container and the data associated with the second container using a merger cursor. Alternatively or in combination, the unified content provider performs a sorting operation on the data associated with the first container and the data associated with the second container using a sorting cursor. At 318, the unified content provider sends the generated unified data to the application.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, at a unified content provider and from an application, a request for unified data, wherein both the unified content provider and the application are included in a first container on an electronic device, the unified content provider generates unified data based on data from different containers, and the unified content provider is different from the application;
determining, by the unified content provider, that the requested unified data includes data associated with a second container on the electronic device, wherein the first container and the second container are different containers;
sending, from the unified content provider to a first hybrid agent associated with the first container, a request for the data associated with the second container;
receiving, at the unified content provider and from the first hybrid agent, the data associated with the second container;
receiving, at the unified content provider and from a different content provider, data associated with the first container, wherein both the unified content provider and the different content provider are included in the first container, the different content provider provides data within the first container, and the different content provider is different from the unified content provider and is different from the application;
generating, by the unified content provider, the unified data based on the data associated with the second container and the data associated with the first container, wherein the generating the unified data by the unified content provider comprises: sorting, by the unified content provider, the data associated with the first container and the data associated with the second container together; and
sending the generated unified data to the application.

2. The method of claim 1, further comprising:
sending a second request from the first hybrid agent to a second hybrid agent associated with the second container for the data associated with the second container; and
receiving, at the first hybrid agent, the data associated with the second container from the second hybrid agent.

3. The method of claim 2, wherein the second hybrid agent determines that the unified content provider is authorized to receive the data associated with the second container based on a security policy.

4. The method of claim 1, wherein generating the unified data comprises performing a merging operation on the data associated with the first container and the data associated with the second container using a merger cursor.

5. The method of claim 1, wherein the sorting is performed using a sorting cursor.

6. The method of claim 1, wherein the first container comprises a personal container and the second container comprises an enterprise container.

7. The method of claim 1, wherein the first container comprises an enterprise container and the second container comprises a personal container.

8. An electronic device, comprising:
a hardware processor;
memory storing a unified content provider and an application that are included in a first container on the electronic device, the unified content provider being different from the application, a first hybrid agent associated with the first container, and a second hybrid agent associated with a second container on the electronic device, wherein the first container and the second container are different containers; and
the unified content provider comprising computer-readable instructions that, when executed by the hardware processor, cause the hardware processor to:
receive, from the application, a request for unified data;
determine, by the unified content provider, that the requested unified data includes data associated with the second container on the electronic device;
send, to the first hybrid agent, a request for the data associated with the second container;
receive, from the first hybrid agent, the data associated with the second container;
receive, from a different content provider, data associated with the first container, wherein both the unified content provider and the different content provider are included in the first container, the different content provider provides data within the first container, and the different content provider is different from the unified content provider and is different from the application;

generate by the unified content provider, the unified data based on the data associated with the second container and the data associated with the first container, wherein the generation of the unified data by the unified content provider comprises: sorting, by the unified content provider, the data associated with the first container and the data associated with the second container together; and send the generated unified data to the application.

9. The electronic device of claim 8, wherein the computer-readable instructions, when executed by the hardware processor, further cause the hardware processor to:

send a second request from the first hybrid agent to a second hybrid agent associated with the second container for the data associated with the second container; and receive, at the first hybrid agent, the data associated with the second container from the second hybrid agent.

10. The electronic device of claim 9, wherein the second hybrid agent determines that the unified content provider is authorized to receive the data associated with the second container based on a security policy.

11. The electronic device of claim 8, wherein generating the unified data comprises performing a merging operation on the data associated with the first container and the data associated with the second container using a merger cursor.

12. The electronic device of claim 8, wherein the sorting is performed using a sorting cursor.

13. The electronic device of claim 8, wherein the first container comprises a personal container and the second container comprises an enterprise container.

14. The electronic device of claim 8, wherein the first container comprises an enterprise container and the second container comprises a personal container.

15. One or more non-transitory computer-readable media containing instructions which, when executed, cause an electronic device to perform operations comprising:

receiving, at a unified content provider and from an application, a request for unified data, wherein both the unified content provider and the application are included in a first container on the electronic device, the unified content provider generates unified data based on data from different containers, and the unified content provider is different from the application;

determining, by the unified content provider, that the requested unified data includes data associated with a second container on the electronic device, wherein the first container and the second container are different containers;

sending, from the unified content provider to a first hybrid agent associated with the first container, a request for the data associated with the second container;

receiving, at the unified content provider and from the first hybrid agent, the data associated with the second container;

receiving, at the unified content provider and from a different content provider, data associated with the first container, wherein both the unified content provider and the different content provider are included in the first container, the different content provider provides data within the first container, and the different content provider is different from the unified content provider and is different from the application;

generating, by the unified content provider, the unified data based on the data associated with the second container and the data associated with the first container, wherein the generating the unified data by the unified content provider comprises: sorting, by the unified content provider, the data associated with the first container and the data associated with the second container together; and sending the generated unified data to the application.

16. The one or more non-transitory computer-readable media of claim 15, the operations further comprising:

sending a second request from the first hybrid agent to a second hybrid agent associated with the second container for the data associated with the second container; and receiving, at the first hybrid agent, the data associated with the second container from the second hybrid agent.

17. The one or more non-transitory computer-readable media of claim 16, wherein the second hybrid agent determines that the unified content provider is authorized to receive the data associated with the second container based on a security policy.

18. The one or more non-transitory computer-readable media of claim 15, wherein generating the unified data comprises performing a merging operation on the data associated with the first container and the data associated with the second container using a merger cursor.

19. The one or more non-transitory computer-readable media of claim 15, wherein the sorting is performed using a sorting cursor.

20. The one or more non-transitory computer-readable media of claim 15, wherein the first container comprises a personal container and the second container comprises an enterprise container.

* * * * *